United States Patent
Isobe et al.

(10) Patent No.: US 6,341,494 B1
(45) Date of Patent: Jan. 29, 2002

(54) AIR CONDITIONING SYSTEM FOR VEHICLES

(75) Inventors: Toshimi Isobe, Isesaki; Keiichi Funakoshi, Saitama; Ichiro Kuwabara, Kiryu, all of (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/432,423

(22) Filed: Nov. 2, 1999

(30) Foreign Application Priority Data

Nov. 5, 1998 (JP) .......................................... 10-314858

(51) Int. Cl.$^7$ ................................................ F24F 11/00
(52) U.S. Cl. ........................ 62/186; 236/49.3; 165/204; 62/244
(58) Field of Search ............................. 236/49.3, 91 C, 236/91 R, 91 E; 165/202, 203, 204, 43, 42; 454/75; 62/186, 244, 131, 126

(56) References Cited

U.S. PATENT DOCUMENTS

| | | |
|---|---|---|
| 3,926,000 A | 12/1975 | Scofield ........................ 62/121 |
| 4,485,635 A | 12/1984 | Sakano ........................ 62/209 |
| 4,498,311 A | 2/1985 | Sakano et al. ................. 62/227 |
| 4,633,674 A | 1/1987 | Sato ............................. 62/197 |
| 4,633,675 A | 1/1987 | Sato |
| 4,637,220 A | 1/1987 | Sakano |
| 4,753,083 A | 6/1988 | Sato |
| 4,788,828 A | 12/1988 | Sato |
| 4,794,763 A | 1/1989 | Kikuchi |
| 4,796,438 A | 1/1989 | Sato |
| 4,840,038 A | 6/1989 | Sato ............................ 62/210 |
| 5,003,785 A * | 4/1991 | Petri et al. ................. 62/244 X |
| 5,137,213 A | 8/1992 | Yamamoto et al. |
| 5,187,942 A | 2/1993 | Komatsu et al. |
| 5,205,484 A | 4/1993 | Susa et al. |
| 5,494,097 A * | 2/1996 | Straub et al. ............. 62/131 X |
| 5,749,236 A | 5/1998 | Tavian et al. |
| 5,988,515 A | 11/1999 | Funakoshi et al. |
| 5,992,156 A | 11/1999 | Isobe et al. |
| 6,012,295 A * | 1/2000 | Isobe et al. ............... 62/186 X |

* cited by examiner

Primary Examiner—Harry B. Tanner
(74) Attorney, Agent, or Firm—Baker Botts L.L.P.

(57) ABSTRACT

An air conditioning system for vehicles includes a restriction control device that reduces the consumptive power of the air conditioning system by reducing the cooling ability of the air conditioning system when a cooling load of an interior of the vehicle has increased over a predetermined level, and when predetermined conditions are satisfied. In the system of the present invention, a water temperature sensor or a switch for detecting the opening of a roof window or a double sliding window is not necessary. In the present invention, under certain predetermined conditions, the power to an air conditioner may be appropriately restricted and the amount of heat radiation at the condenser may also be appropriately restricted. Consequently, the control may reduce waste power to prolong the life of equipment, and which may achieve an improved and comfortable air conditioning state, even when a roof window or a double sliding window is open.

6 Claims, 3 Drawing Sheets

AIR CONDITIONING SYSTEM FOR VEHICLES

BACKGROUND OF THE INVENTION

1. Field of the Invention

The present invention relates to an air conditioning system for vehicles, and, more specifically, to an air conditioning system suitable as an air conditioner for use in a work vehicle.

2. Description of the Related Art

In a vehicle having a radiator supplying water to an engine, the radiator is generally mounted in an engine compartment together with other equipments for an air conditioner. A compressor provided in a cooling circuit of the air conditioner is generally driven by using the power of an engine. If the consumptive power of the engine is too much, the engine may heat up and the water temperature in the radiator may be too hot, thereby causing the vehicle to overheat. If the vehicle overheats or a warning that the vehicle is about to overheat occurs, the operation of the vehicle is stopped or a restriction on the operation of the vehicle occurs.

In work vehicles, for example power shovels, common sized cabins are frequently used regardless of the size or weight of the vehicles. Thus, the specification and abilities of air conditioners required for such common cabins may be substantially the same. However, the engine and equipment around the engine, including the radiator, tend to become smaller as the size and weight of the vehicle decreases. Therefore, in smaller sized work vehicles:

a) The amount of power consumed to drive the compressor of the air conditioner and thus the total consumptive power of the engine is increased, and the engine tends to heat up.

b) The condenser covers a greater amount of area of the radiator so that the ability of the radiator to handle heat radiation decreases.

c) Because generally, the engine compartment is not too wide, the ability to exhaust heat is not good. Therefore, heat tends to be trapped in the engine compartment, and a) and b) may be exasperated. As a result, in smaller vehicles the water temperature in the radiator tends to be high, and overheating often occurs.

Moreover, in a work vehicle, a door and/or a window may frequently be open. This causes the cooling load to increase, which causes the heat radiated from the condenser to increase, which results a decrease in the ability of the radiator to handle the heat radiation. As a result, the water temperature in the radiator may increase and the vehicle may overheat.

Further, in a work vehicle, a door or a window of a cabin, or both, may be opened during vehicle operations. In such situation, the cooling load may increase such that it is difficult to achieve a comfortable degree of air conditioning for the operator. For example, when a door or a window is opened in warm weather, the temperature or amount of air blown from an air conditioner is controlled, such that the temperature in the cabin approaches a set temperature. In such a situation, it may be difficult to achieve a comfortable cooling condition by allowing the ports to continue to blow out temperature controlled air without adjustment. In such a situation, the cooling effect of most of the temperature controlled air may be wasted. Moreover, a heavy load may be applied to the compressor because of the refrigerant provided in the cooling circuit of the air conditioner, or to the blower because it is blowing conditioned air. Therefore, wasted power increases and the operation life of the equipment is reduced. Further, because the compressor usually is driven by utilizing the power of the vehicle engine, the load on the engine increases and overheating may occur.

Attempts to solve such problems include reducing the consumptive power of the air conditioner in response to the water temperature in the radiator, which is detected by a water temperature sensor, and reducing the consumptive power of an air conditioner by detecting when a door or a window is open by using a switch or a sensor on the door or the window.

Thus, under these methods, the consumptive power of an air conditioner may be appropriately reduced, and the overheating of a vehicle may be appropriately avoided, however, either a water temperature sensor, or a switch or a sensor for a door or a window may be needed. If such a sensor or a switch is not provided, it may be difficult to appropriately reduce the consumptive power of the air conditioner, or to appropriately avoid overheating. In particular, when a roof window or a double sliding window, which does not have a switch or a sensor, is opened, it may be difficult to appropriately reduce the consumptive power of the air conditioner or to appropriately avoid overheating.

SUMMARY OF THE INVENTION

Accordingly, it is an object of the present invention to provide an air conditioning system for vehicles, suitable for work vehicles, which may reduce waste power to prolong the life of the equipment, and which may achieve an improved and comfortable air conditioning state, even when a roof window or a double sliding window, with or without a switch, is open.

To achieve the foregoing and other objects, an air conditioning system for vehicles according to the present invention is provided. The air conditioning system for vehicles according to the present invention comprises a restriction control device for reducing the consumptive power of the air conditioning system by reducing a cooling ability of the air conditioner system when a cooling load for cooling an interior of the vehicle increases over a predetermined level and when predetermined conditions are satisfied.

In the air conditioning system of the present invention, the restriction control device may control certain ports to be opened or closed and control an amount of air discharged into the interior of the vehicle from the open ports, under a condition of reduced consumptive power. For example, the control device limits a port to be opened to only to a face mode port, under a condition of reduced consumptive power. Under such control, spot cooling an operator and reduction of the amount of air flow are each achieved. Therefore, an improved and comfortable air conditioning state depending on a present condition, an d an optimum operation condition with less waste power, may be both achieved.

The control device preferably returns the system from a condition of reduced cooling ability to a condition of normal cooling ability, when the cooling load decreases.

In particular, such an air conditioning system according to the present invention may be useful for a work vehicle.

In the air conditioning system according to the present invention, particularly in a work vehicle, even if a roof window or a double sliding window of a cabin is opened, ports to be opened are limited to those most suitable ports, depending on the conditions at the present time. Therefore, an improved and comfortable air conditioning state for an operator, and improved and optimum driving conditions with reduced waste power and reduced loads to the equipment, may be achieved. Comfortable spot cooling may be achieved particularly in the summer, because during the heat of the summer it is difficult to reduce the temperature of the cabin to a desired temperature when a roof window or a double sliding window is opened by allowing only a face mode port to be opened. Moreover, because the face mode port originally allows only a small amount of maximum air, the controlled air also may be reduced. Therefore, waste power may be reduced, the load applied to a blower or a compressor in a cooling circuit may be reduced, and the life of the equipment may be extended. Further, control may shift to another mode depending on the condition, by appropriately restricting the positions of the ports to be opened and the amount of air flow, while still maintaining comfortable air conditioning and improved driving conditions resulting in a reduction in waste power.

Further objects, features, and advantages of the present invention will be understood from the following detailed description of a preferred embodiment of the present invention with reference to the accompanying figures.

BRIEF DESCRIPTION OF THE DRAWINGS

A preferred embodiment of the invention is now described with reference to the accompanying figures, which is given by way of example only, and is not intended to limit the present invention.

DETAILED DESCRIPTION OF THE PREFERRED EMBODIMENT

Figure 1:
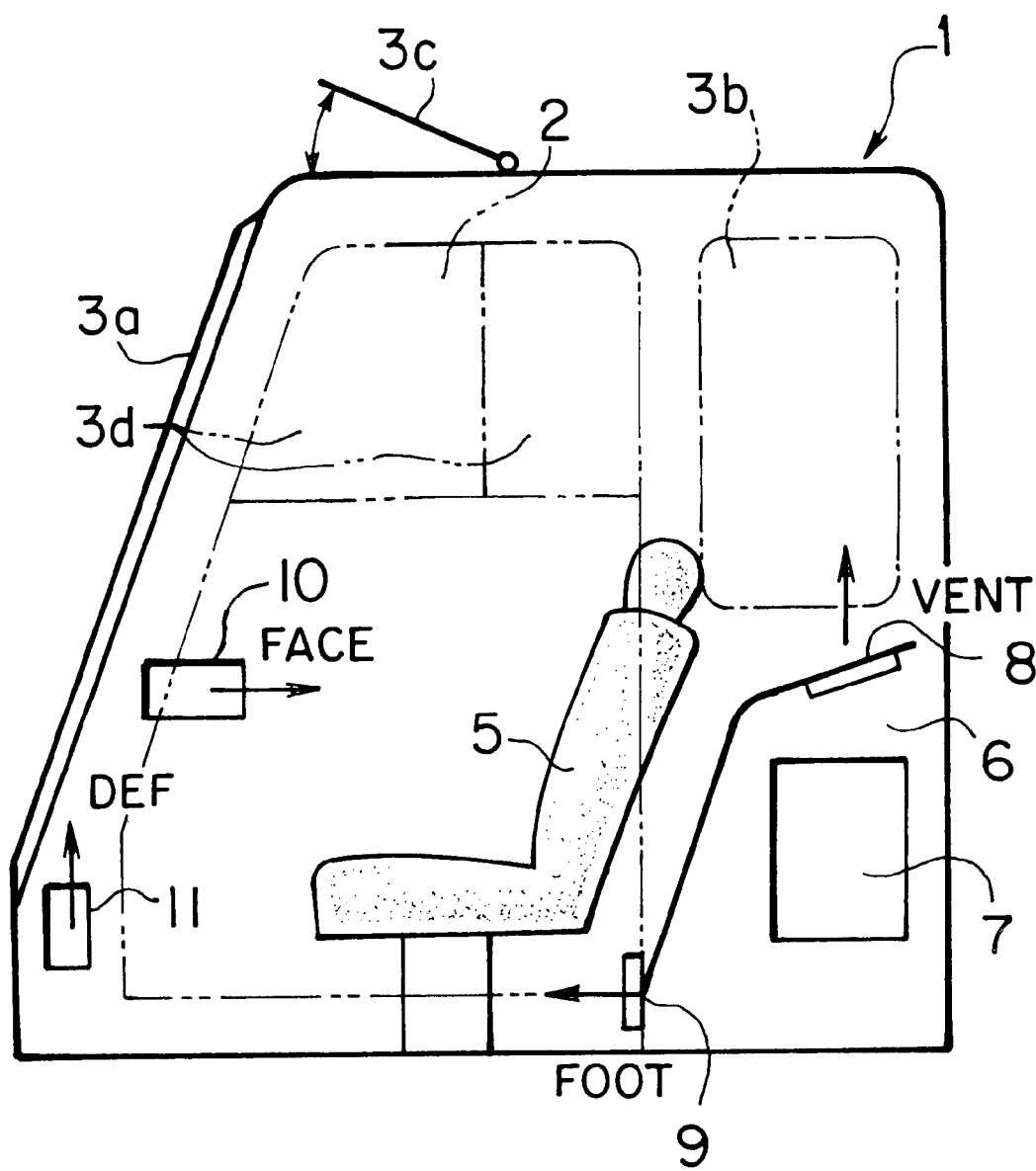
FIG. 1 is a schematic, vertical sectional view of a cabin of a work vehicle using an air conditioning system according to an embodiment of the present invention.
Figure 2:
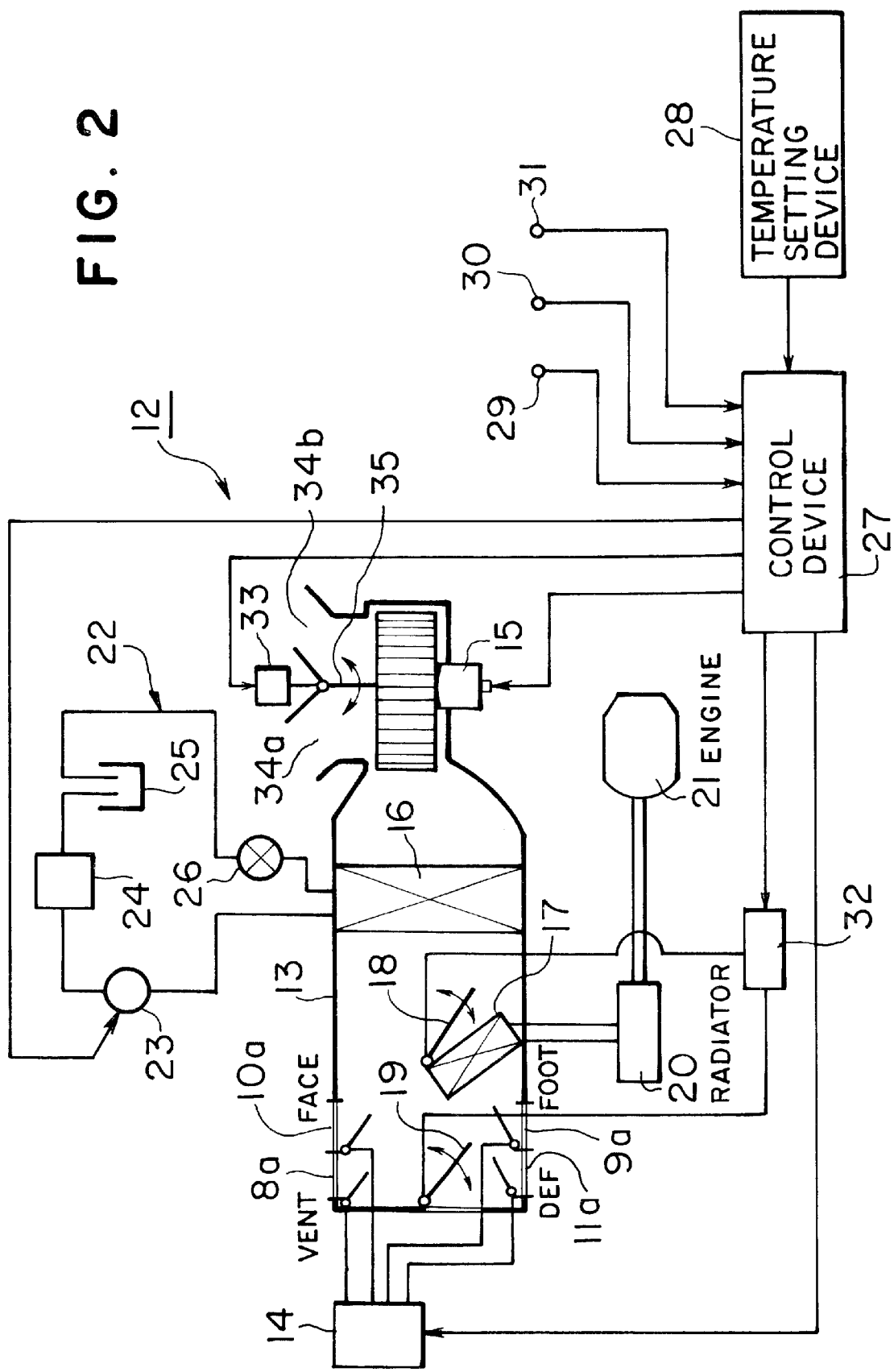
FIG. 2 is a schematic diagram of the air conditioning system according to an embodiment of the present invention.

FIGS. 1 and 2 show an embodiment of an air conditioning system for a work vehicle according to the present invention. FIG. 1 depicts a cabin 1, and FIG. 2 depicts an air conditioner provided to the work vehicle. In FIG. 1, cabin 1 has a door 2, a front window 3a, a rear side window 3b, a roof window 3c, a double sliding window 3d, which may be incorporated into door 2, and an operator's, or driver's, seat 5. Main body 7 of the air conditioner is provided in a parts compartment 6 disposed at a rear position in cabin 1. Compartment 6 also contains other parts such as a vehicle's electronic control unit and other electric parts. The temperature controlled air from main body 7 of the air conditioner flows into cabin 1 through selectively opened ports, which are among a plurality of ports that face toward the interior of cabin 1. In this embodiment, the ports comprise VENT mode port 8, FOOT mode port 9, FACE mode port 10, and DEF mode port 11. In a normal control state, the ports are automatically selected in an automatic mode. In a manual mode, the ports are manually selected by an operator.

FIG. 2 depicts air conditioner 12 in accordance with the present invention. At one end portion of air duct 13, VENT mode air port 8a, FOOT mode air port 9a, FACE mode air port 10a, and DEF mode air port 11a, are provided. The VENT mode air port 8a, FOOT mode air port 9a, FACE mode air port 10a, and DEF mode air port 11a, communicate with VENT mode port 8, FOOT mode port 9, FACE mode port 10, and DEF mode port 11, respectively, each of which opens into cabin 1. In this embodiment, these ports 8a, 9a, 10a, and 11a are opened and closed by a single port switching actuator 14, individually, or, in combination.

A blower 15 is provided in the other end portion of air duct 13. A switching damper 35 controls the mixing ratio of inside air sucked through inside air port 34a to outside air sucked through outside air port 34b. The operation of switching damper 35 is controlled by switching damper actuator 33. Air drawn from inside or outside the cabin, or mixed air, is forced by blower 15 into air duct 13.

An evaporator 16 for refrigerant, and a heater core 17 are disposed in air duct 13 from the upstream side to the downstream side, respectively. An air mixing damper 18 is provided immediately upstream of heater core 17 for adjusting the mixing ratio of air passing through heater core 17 and air bypassing heater core 17. The operation of air mixing damper 18 is controlled by air mixing damper actuator 32. A cool max damper 19 for enabling a cool max mode is provided at a position downstream of heater core 17 and between (i) VENT mode air port 8a and FACE mode air port 10a, and (ii) FOOT mode air port 9a and DEF mode air port 11a. Water from radiator 20 is circulated into heater core 17. This radiator water also is used as cooling water for engine 21.

Refrigerant is circulated in cooling, or refrigerant, circuit 22. Cooling circuit 22 includes an evaporator 16, a compressor 23 for compressing refrigerant sent from evaporator 16, a condenser 24 for condensing refrigerant sent from compressor 23, a reservoir tank 25, and an expansion valve 26.

The controlled temperature in cabin 1 is set in temperature setting device 28, and the controlled temperature signal for the set temperature is input to restriction control device 27. In temperature setting device 28, either an automatic mode or a manual mode is selected. The signals for: the interior air temperature detected by inside air temperature sensor 29, the outside air temperature detected by outside air temperature sensor 30, and the amount of sunshine detected by sunshine sensor 31, are input to control device 27. Control device 27 sends control signals to blower 15, switching damper actuator 33, compressor 23, air mixing damper actuator 32, and cool max damper 19. The voltage applied to blower 15 may be controlled so that the amount of air blown may be adjusted steppedly, or, in the alternative, continuously between a low level (L) and a high level (H).

In the air conditioner of the present invention, the control of air temperature is performed as follows. The following control is shown as an example only, and the present invention is not limited thereto.

In restriction control device 27, the air ports to be opened are determined and controlled when operation under the system of the present invention begins. In this embodiment, the amount of air flow (e.g., the amount of voltage supplied to the blower) from blower 15 is controlled, for example, as depicted in Table 1. The target conditioned air temperature (TOC) may be determined by a calculation performed in control device 27, for example, based on a temperature difference between the interior air temperature detected by inside air temperature sensor 29 and the temperature set by temperature setting device 28, the exterior air temperature detected by outside air temperature sensor 30, the amount of sunshine detected by sunshine sensor 31, predetermined basic control values and coefficients, or the like.

The condition for which the system of the present invention may begin, for example, may be when in cool max mode, a high level (H) of air is blown, and a predetermined temperature, no lower than 30° C., is detected for more than 1 hour in the interior of cabin 1 by inside air temperature sensor 29. When conditions such as these, that create a high cooling load, or other conditions that satisfy conditions similar to these predetermined conditions exist, the control according to the present invention may start.

Figure 3:
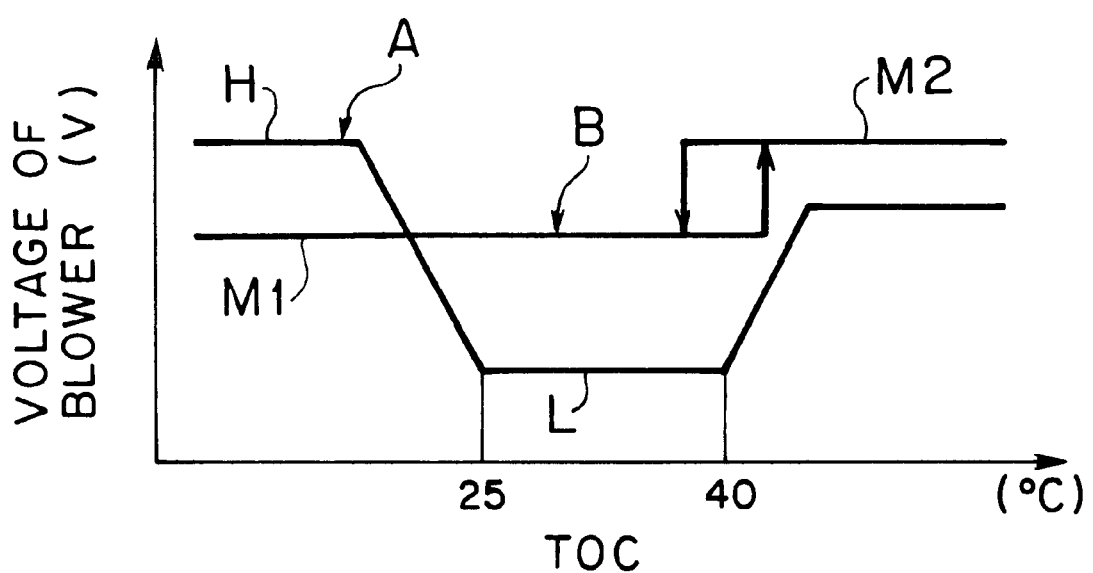
FIG. 3 is a schematic diagram showing the control of the voltage of a blower in the system depicted in FIG. 2.

In automatic control mode, when the above-described predetermined conditions are satisfied, for example, the system may be forcibly restricted to only the FACE mode port, although other ports, including VENT mode port, may have been opened in the usual automatic control mode of the air conditioner by the time of this switching, as depicted as C1 in Table 1. In this situation, the system is restricted to local cooling through the FACE mode port. In this case, the voltage delivered to blower 15, which determines the amount of air flow, is controlled according to line A depicted in FIG. 3, which is a condition in the automatic mode depicted as C2 in Table 1. FACE mode port is a port that allows only a small amount of maximum air and is not significantly effected by adjustments in the pressure loss in the duct communicating FACE mode port 10 that opens into cabin 1 and FACE mode air port 10a that opens in air duct 13. By restricting the system to only the FACE mode port, comfortable spot cooling for an operator may be achieved, while reducing the amount of air flow, thereby reducing the consumptive power of blower 15 and compressor 23, even when roof window 3c or double sliding window 3d is opened.

When control of the system is in automatic mode, control may be switched to manual mode, which allows the ports to be opened manually. However, the amount of air flow that may be manually selected, or the blower voltage that may be manually selected, may be restricted, as depicted by line B in FIG. 3, to prevent excessive power consumption, as depicted by C3 in Table 1. As depicted by line B in FIG. 3, while the manual setting of the amount of air may be one of four levels (L (low), M1, M2 (between M1 and H), or H (high)), the amount of air flow may be restricted to the M1 level in the low and middle temperature ranges of TOC. With this restriction, even in manual mode, the air conditioning may be as comfortable as possible under the present condition, while still creating a reduction in the cooling load and the amount of air flow and decreasing the consumptive power of blower 15 and compressor 23. Although line B in FIG. 3 has a hysteresis on the release portion for the above-described restriction, the hysteresis does not have any particular relation to control according to the present invention.

Even when manual mode is initially selected, restriction control may be performed similarly to that described above in automatic mode, as depicted by C4 in Table 1. However, because control is under manual mode, the amount of air flow may be restricted by the line B depicted in FIG. 3, as described above. Further, if the port to be opened is changed while in manual mode, the control may be restricted by line B of FIG. 3, as depicted in Table 1.

The above-described restriction control is released when the target conditioned air temperature becomes higher than 25° C., when a compressor switch is turned off, when an engine key is turned off, or when an on/off switch for the control is turned off at least 30 minutes after the control has started. After such release, control returns to the normal automatic or manual control mode.

TABLE 1

| | Control mode | | | | |
|---|---|---|---|---|---|
| | Automatic mode | | Manual mode | | |
| | Port | Air amount | Port | Air amount | Return of control |
| Operation for air conditioning | C1 | C2 | C4 | C3 | Target conditioned air temperature: ≧−25° C. or, compressor switch: off or, engine key: off or, on/off switch: off after 30 min. |
| Possibility of manual mode | possible | C3 | possible | C3 | |

C1, C2, C3, C4: described in the specification

Further, in the control system according to the present invention, a buzzer may be rung or a lamp may be activated as a warning that such a situation is about to occur or has occurred. Moreover, the buzzer or the lamp may be operated to indicate when the restriction control mode according to the present invention has been completed.

Although only one embodiment of the present invention has been described in detail herein, the scope of the invention is not limited thereto. It will be appreciated by those skilled in the art that various modifications may be made without departing from the scope of the invention. Accordingly, the embodiment disclosed herein is only exemplary. It is to be understood that the scope of the invention is not to be limited thereby, but is to be determined by the claims which follow.

What is claimed is:

1. An air conditioning system for a vehicle comprising a restriction control device for reducing a consumptive power of the air conditioning system by reducing a cooling ability of the air conditioning system when a cooling load for cooling an interior of the vehicle increases over a predetermined level, wherein when said air conditioning system operates in a cool max mode, said cooling load increases over said predetermined level when an internal temperature increases above a predetermined internal temperature for a predetermined period of time.

2. The air conditioning system according to claim 1, wherein said restriction control device controls at least one port in the air conditioning system to be opened and an amount of air discharged into said interior of said vehicle through the at least one port that is open, when the air conditioning system is in a condition of reduced consumptive power.

3. The air conditioning system according to claim 2, wherein the at least one port is a face mode port.

4. The air conditioning system according to claim 1, wherein said restriction control device returns control of the air conditioning system from a condition of reduced cooling ability to a normal control condition, when said cooling load has decreased to a predetermined level.

5. The air conditioning system according to claim 1, wherein said vehicle is a work vehicle.

6. The air conditioning system according to claim 1, wherein said cooling ability of said air conditioning system is reduced when predetermined conditions are satisfied.

\* \* \* \* \*